Feb. 21, 1933. F. E. WYLAND 1,898,968
COMBINED COOKER AND STIRRER FOR POP CORN AND THE LIKE
Filed May 16, 1929 2 Sheets-Sheet 1
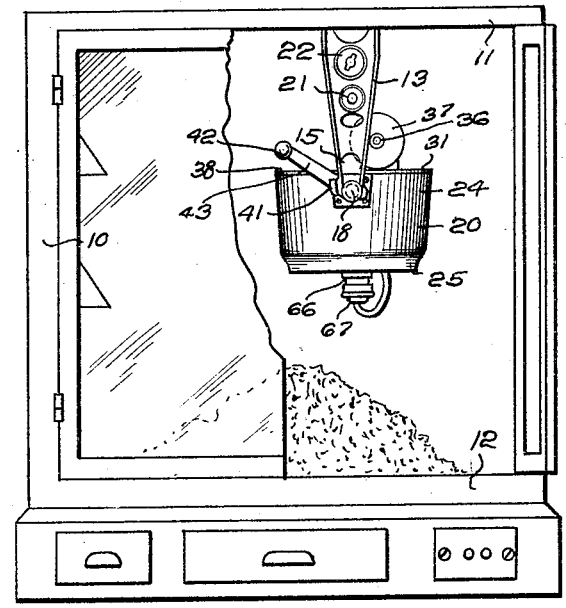
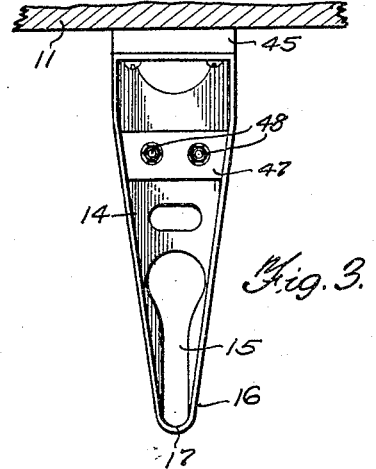
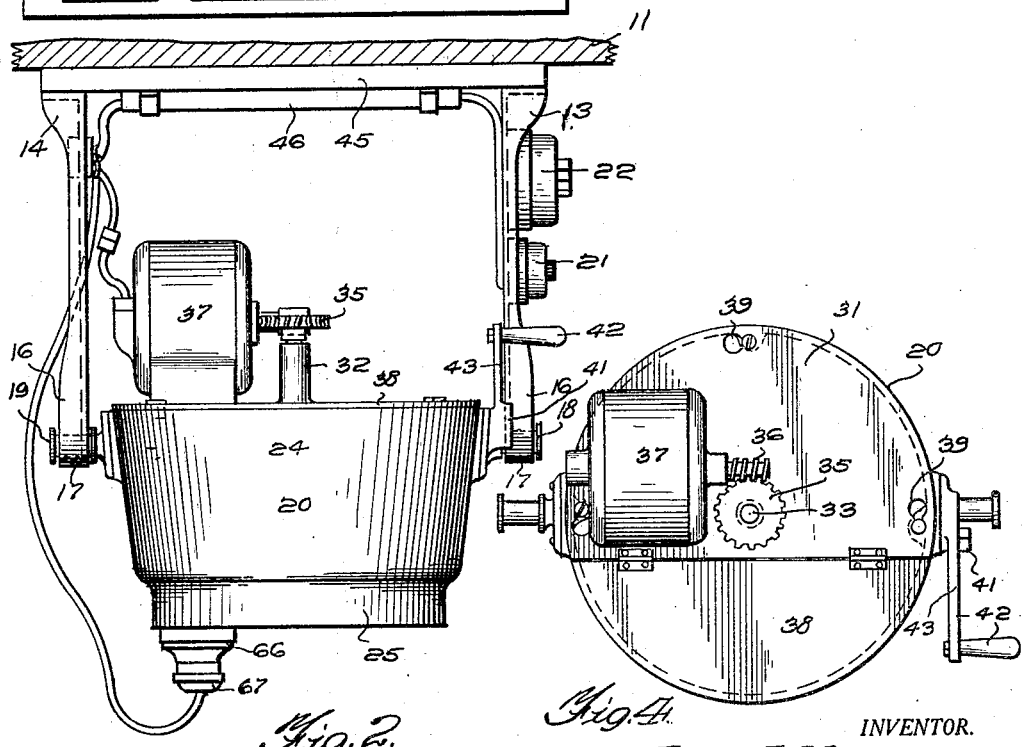
INVENTOR.
FRANK E. WYLAND,
BY H. S. Woodward,
ATTORNEY.

Feb. 21, 1933. F. E. WYLAND 1,898,968
COMBINED COOKER AND STIRRER FOR POP CORN AND THE LIKE
Filed May 16, 1929 2 Sheets-Sheet 2

INVENTOR.
FRANK E. WYLAND,
BY H S Woodward
ATTORNEY.

Patented Feb. 21, 1933

1,898,968

UNITED STATES PATENT OFFICE

FRANK E. WYLAND, OF NEWPORT, KENTUCKY

COMBINED COOKER AND STIRRER FOR POP CORN AND THE LIKE

Application filed May 16, 1929. Serial No. 363,560.

The invention relates to cooking apparatus, and particularly to combined cooker and stirring devices, and has for an aim to provide a novel construction especially useful in producing pop corn, but applicable to other uses. It is a special aim of the invention to present a unit mechanism adapted to be installed in cabinets of various constructions. Another purpose of the invention is to provide a novel mounting for a kettle device. An object is to present a novel structure in the elements of the appliance.

A further object is to present a novel co-ordination of a motor driven stirring device and kettle. It is an important aim to enable the tilting of the kettle to discharge the contents at will, while yet retaining the advantages of a unit kettle stirring device, and motor therefor, of a simple character and high efficiency. Another aim is to effect a novel construction of the heater unit to the end that it may be quickly repaired or replaced when required.

Additional objects, advantages and features of invention reside in the construction, arrangement and combination of parts as may be more readily understood from the following description and accompanying drawings, wherein Figure 1 is a front elevational view of a cooker unit constructed in accordance with my invention, Figure 2 is a side view from the left, Figure 3 is a view of the rear bracket.

Figure 4 is a top view of the kettle and motor unit.

Figure 5:
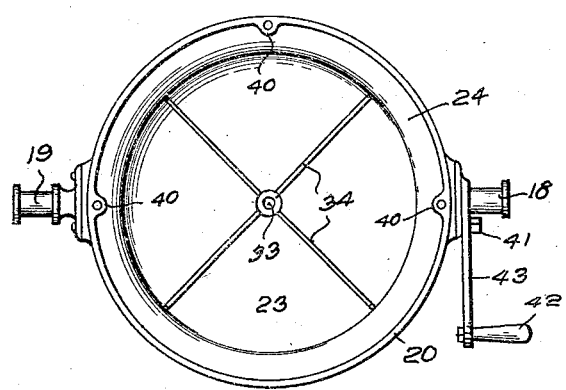
Figure 5 is a top view of the kettle alone.
Figure 7:
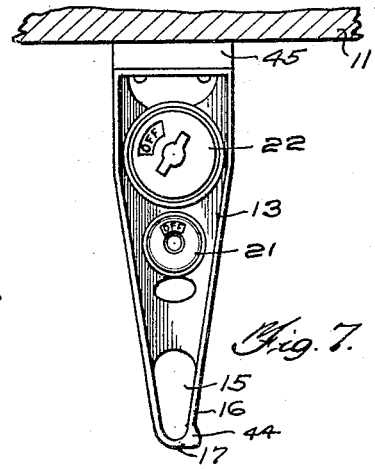
Figure 7 is a detail of the front bracket.
Figure 6:
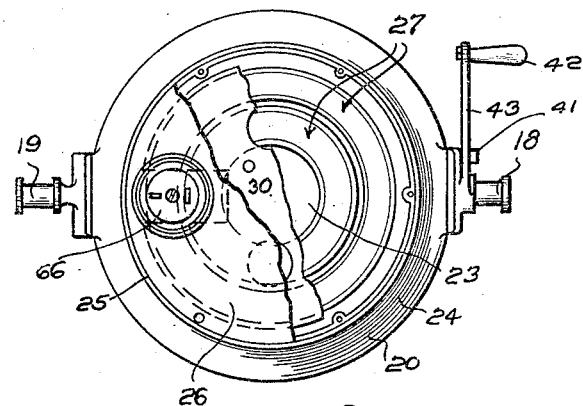
Figure 6 is a bottom view of the apparatus with parts broken away to show heater units in place.

There is illustrated a cabinet 10 of any suitable construction for the use of a vender of pop-corn or other material which may be cooked in my appliance, these cabinets varying in style over a wide range, but my invention is applicable to all, by the use of similar mounting devices in every instance. The cabinet includes an upper section having a roof 11 and floor 12 ordinarily enclosed in a manner to enable ready access to the interior of the cabinet and to the kettle and control devices mounted in the cabinet. Secured upon the under side of the roof 11 there are two alined brackets 13 and 14, each comprising transverse web portions in the lower parts of which there are alined bearing openings 15 enlarged at their upper parts, and terminating at their lower ends in flanges 16, the lower parts of which form bearings 17 flush with the lower parts of the slots to receive the trunnions 18 and 19 of a kettle 20 to be described. Upon the front bracket there are mounted switches 21 and 22 for controlling a motor on the kettle, and heater units 27 mounted in the bottom of the kettle.

The trunnions 18 are mounted at the extreme upper part of the kettle, one of the trunnions at least having a channel therearound spaced near its extremity, a substantial part of the trunnion being inward of the channel. The bottom of this groove is journalled in the bearing 17, and the sides of the groove engage outwardly of the bearing to prevent longitudinal movement of the kettle trunnion on its bearing.

The kettle 20 includes a bottom 23, and side wall 24 formed integrally with the bottom ordinarily. Also formed integrally on the kettle and extending downwardly from the bottom, there is a cylindrical flange 25 rabbeted at its extreme lower part to receive a closure plate 26 by which heater units 27 of approved construction are enclosed.

The bottom 23 is formed also with two concentric channels 28, of substantial width compared to the radius of the bottom, so that there is but a small area centrally of the bottom inwardly of the inner channel. The channels have flat bottoms, and there are two annular heater units lying respectively in the channels. The units are held tightly pressed against the bottom 23 by means of a circular plate 30 held firmly to the bottom by a suitable number of screws. The leads from the heater units are led to the switch 21 by a cable having suitable amount of slack to accommodate the rocking of the kettle as required for dumping the contents when cooked.

There is a socket 66 on the clamping plate 30 with which a plug 67 on the end of the leads from the switch 21 may coengage.

Upon the top of the kettle there is secured a cover consisting of a fixed plate 31 secured to the kettle, this plate being in the form of a truncated circle, the line of truncation being a distance beyond the center so that a central vertical upstanding bearing 32 may be mounted or formed thereon in which there is journalled the vertical shaft 33 of an agitator or stirrer 34 having a series of radiating arms arranged to move in close relation to the bottom of the kettle when the shaft rotates. The bearing 32 as shown extends both above and below the plate 31 to afford a good support for the shaft 33. It may be bushed in any approved manner. At the upper end of the shaft there is fixed a worm gear 35 meshed with the worm 36 on the horizontal main shaft of an electric motor 37. The motor is permanently mounted on the plate 31. Hinged to the plate 31 there is a lid plate 38 concentric with the plate 31. The plate 31 is provided with a series of key-slots 39 adjacent its curved edge, the smaller parts of the slots being all turned in the same direction, and similarly spaced lugs 40 are formed on the wall of the kettle, in which there are engaged screws, the heads of which are adapted to enter through the larger parts of the slots 39, and to clamp the edges of the plate 31 beside the smaller parts of the slots.

For convenience in manufacture, the trunnions 18 and 19 are cast separately and fastened to suitable bosses formed integrally on the kettle, and the base of the front trunnion is provided with a strike lug 41 positioned to strike the adjacent bracket 13 at the left hand side when the kettle is in horizontal position. The motor 37 is located to the right of the axis of the trunnions, so that its weight will serve to hold the kettle against casual tilting, and the kettle itself may be so offset, if desired, for the same purpose. For tilting the kettle, a handle 42 is mounted on an arm 43 extended diagonally toward the left and upwardly from the lug 41, and the adjacent portion of the bracket at the bottom is formed concentric so that the lug will clear it until the lug moves upward against the side of the bracket. The rear part of the bottom of the bracket is formed with a heel portion 44 against which the lug 41 will strike when the kettle is tilted to a desirable maximum, which may be a position produced by rotation to the left through an arc of 160 degrees more or less.

In the use of my invention, the brackets 13—14 are secured to the roof of the cabinet or other horizontal support with the bearings 17 spaced to correspond to the spacing of the journal portions of the trunnions in the kettle. The motor and trunnions being secured in place as shown on the kettle, the kettle is then presented diagonally from the left side of a line between the brackets and one trunnion entered through the large upper part of the bearing opening in the rear bracket. The groove in the rear trunnion being spaced a distance outward on the trunnion, it is possible to thrust the trunnion further through the bracket 14 than its normal bearing position, and this permits the end of the front trunnion to be swung within the front bracket 13 and alined with the large upper part of the opening 15 in the front bracket, after which the kettle is moved bodily forward to enter the front trunnion in the front bracket.

In practice the two brackets may be assembled on a wooden plate 45 in the proper spaced relation, so that the purchaser may secure the brackets in proper position expeditiously in any suitable cabinet with a minimum liability of error in the positioning of the brackets. The leads from the switches to the motor and heating units and the line connection are extended from the switches upwardly and thence rearwardly through an insulating conduit 46, so that they are held clear of interference with implements used in or about the kettle.

The brackets are both of similar shape, including a web portion which in the front bracket is utilized for mounting the switches and in the rear bracket serves as a mounting for a plate 47 of insulating material in which two binding posts 48 are mounted from one of which the lead to the switches is extended through the conduit 46, and from the other post a direct connection with one side of the heating unit and one brush of the motor are carried. The power or main line connection is made by connections with the binding posts in any approved manner.

The device being mounted and the proper connections made, the kettle may be used for cooking various foods. But in its use for cooking pop corn, for instance, the heating units being energized by operation of the switch 22 for a suitable period and the corn introduced, the motor is caused to operate by operation of the motor switch 21. As soon as the cooking has been properly completed, the handle 42 is operated to tilt the kettle, which may be turned easily through an arc of 160 degrees. As it passes 90 degrees of movement from initial position, gravity acting on the lid and the weight of the content of the kettle pressing against the lid 38, cause the latter to swing open and permit the content of the kettle to be discharged. Ordinarily this discharge is effected directly upon the floor 12 of the cabinet 10, though other methods of disposal may be employed as found desirable.

The motor should operate to turn the spider 34 in the direction of the reduced parts of the slots 39, in order that the stationary lid portion will tend to remain in secured position by torque exerted.

I claim:—

A cooker comprising a support, a kettle unit pivoted thereon to rock from an initial cooking position to discharge position inverted, a strike on the kettle to engage the support at respective limits of tilting movement, the center of gravity of the kettle unit being located to hold the kettle in initial position with the strike engaged, and movable with the kettle across dead center, whereby to hold the kettle in discharge position.

In testimony whereof I affix my signature.

FRANK E. WYLAND.